INVENTORS:
ALFRED LONG
NOEL N. COE

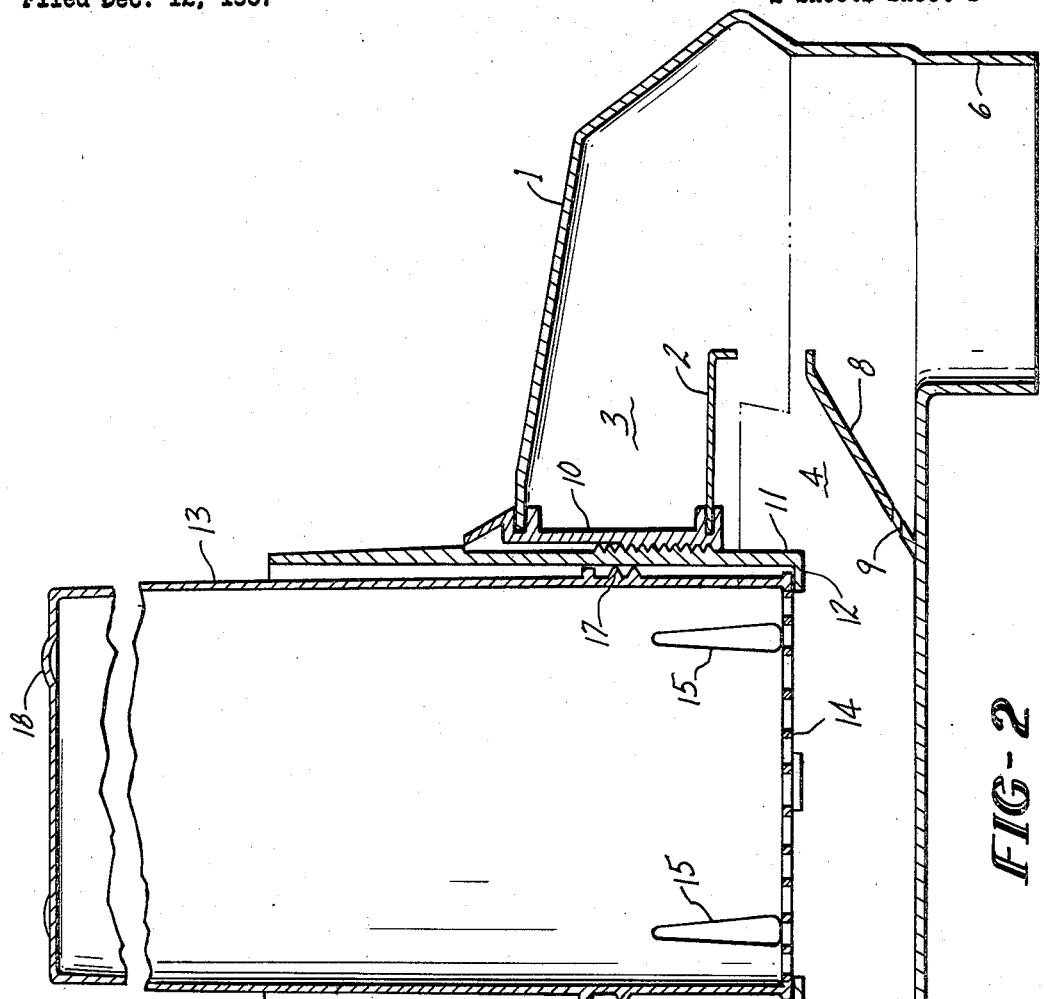
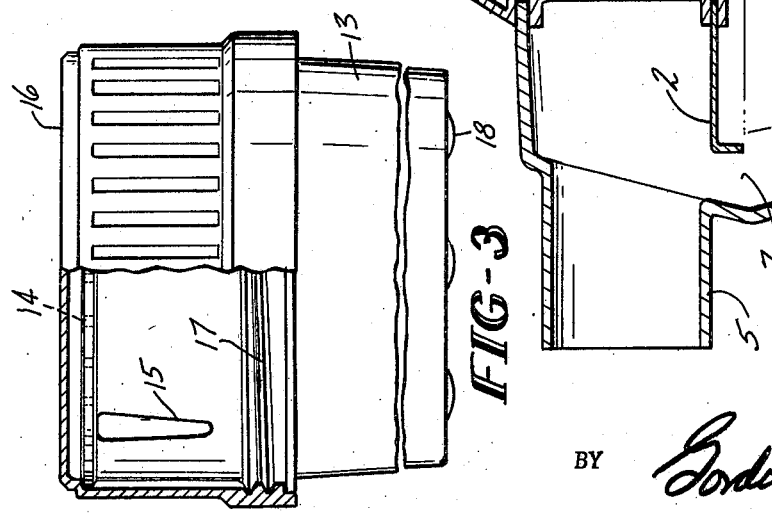

United States Patent Office 3,495,948
Patented Feb. 17, 1970

3,495,948
BYPASS CHEMICAL DISSOLVER
Alfred Long, New Haven, and Noel N. Coe, Woodbridge, Conn., assignors to Olin Mathieson Chemical Corporation
Filed Dec. 12, 1967, Ser. No. 689,974
Int. Cl. B01f 1/00
U.S. Cl. 23—272.7                                    2 Claims

ABSTRACT OF THE DISCLOSURE

This dispenser divides an inlet fluid stream and flows a first, larger portion of the inlet stream through a first chamber and a second, smaller portion of the inlet stream through a second chamber. The pervious end of an adjustably positioned, solute-containing magazine extends into the second chamber and is contacted by the second, smaller portion of the inlet stream to dissolve the solute. The first and second portion streams are recombined and discharged.

---

Figure 1:
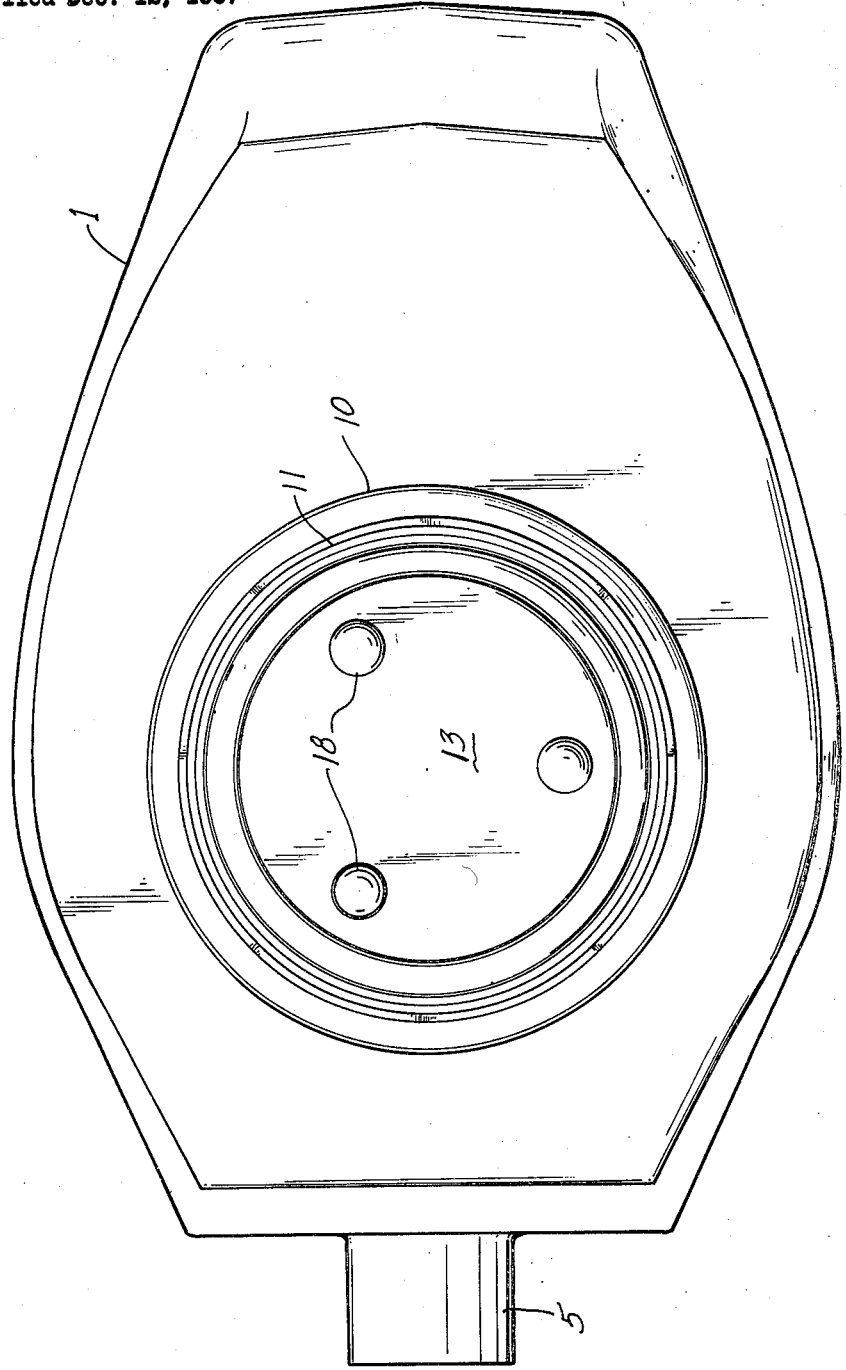

This invention relates to apparatus for the preparation and controlled feeding of aqueous solutions of solid particulate materials. More particularly, the apparatus provides means for preparing aqueous solutions of water-soluble solids and dispensing said solutions at controlled rates. Still more particularly, this invention relates to apparatus for supplying solutions containing available chlorine over a wide range of concentrations from solid hypochlorite compositions in conveniently handled, granular, pressed or tabletted forms in accurately controlled amounts for use in a variety of chlorination and water treating applications differing widely in the ultimate concentration of the solution required.

In the treatment of water supplies, including swimming pools in particular, a supply of aqueous solution of an available halogen compound, preferably a hypochlorite is commonly metered into a flowing body of the liquid to be treated. Such practice requires the purchase of hypochlorite solutions or the preparation of solutions at the point of use from a dry available halogen compound. Sodium hypochlorite solutions are available commercially at concentrations not exceeding 15% of available chlorine but such solutions deteriorate rapidly during shipment and storage. More dilute solutions are bulky and expensive per unit of available chlorine. Solid sodium hypochlorite compositions are not available because they are very unstable. Calcium hypochlorite, on the other hand, particularly in the form of high test hypochlorite, can be shipped as a relatively stable solid containing 70% or more of available chlorine and can be stored for long periods without appreciable loss of available chlorine.

In spite of the advantages of solid calcium hypochlorite over other sources of available halogen for use as a sterilizing agent, there is a problem in applying the solid continuously and directly to water in such a manner that only a few parts per million of available chlorine are ultimately present in the water. In conventional methods of application in swimming pools, granular calcium hypochlorite is sometimes added directly to the water in the pool or tablets are placed in the skimmer or in dissolving baskets around the pool. Preferably, however, solid calcium hypochlorite is dissolved in water to form a solution of desired concentration which is metered into the water in the circulating system at a rate to maintain residual chlorine generally at 0.3 to 0.6 parts per million in the pool. In using this method of application, there is sometimes difficulty with sludge formation in making up the solution. The sludge tends to clog filters and sensitive metering devices used to supply the solution in small amounts to the body of liquid to be treated. Consequently, it is necessary to clean these devices frequently or to filter the sludge from the solution prior to passing the solution through the metering devices.

Water-sensitive salts present additional problems in designing satisfactory dispensers. Solid calcium hypochlorite, when wet, decomposes rapidly. It is an object of this invention to provide a dispenser useful for dispensing such salts in which turbulent flow in the region of undissolved solute is avoided and in which no more solid solute is wetted than quickly dissolves.

Many devices have been devised to control dissolution of soluble solutes but which are not satisfactory for use with calcium hypochlorite or other materials having a similar degree of solubility in water or similar sensitivity to decomposition in water.

Most of the dispensers of the prior art require controlled water flow rates and are designed to promote vigorous mixing of solute and solvent. Undissolved solute is wetted with solvent and remains wetted until dissolved. This is disastrous in the case of solid calcium hypochlorite which decomposes rapidly when wet, especially at warm temperatures. The design of the dispenser of this invention is particularly appropriate for dissolving and dispensing calcium hypochlorite and other water-sensitive solids. In contrast to dispensers which maintain undissolved solute in wetted condition, the dispenser of the present invention maintains substantially all of the undissolved solute in unwetted condition with a minimum portion in wetted condition. The supply magazine of the present device is closed at one end and pervious at the other. It is provided with vent slots at the pervious end to prevent ingress of fluid. Solute flows across the pervious end rather than into and out of the magazine.

U.S. Patent 1,216,051 shows a dispensing device having a solute-containing magazine covered at one end by a perforated disk and supported at a fixed elevation in the total stream of flowing water to be treated. The flow of the total stream promotes turbulence in the region of the perforated end of the magazine. In addition, the magazine is not vented near the pervious end which promotes extensive wetting of undissolved solute. In contrast, in the device of the present invention, the solute-containing magazine is adjustable with reference to the level of the water into which it is partially immersed, it is vented to prevent extensive wetting of undissolved solute and the major portion of the total flow of solvent bypasses the solute-containing magazine to avoid turbulent flow in the region of the pervious end of the magazine.

U.S. Patent 2,760,820 shows a dispenser in which solid solute is fed through an orificed plate into an upper chamber to which fluid is fed. The solution passes over a dam into a lower chamber similarly fed with fluid and from which solution passes over a dam to the outlet. The solute-containing part is not an adjustable or replaceable magazine and is not immersed or contacted by the solvent as in the device of the present invention.

U.S. Patent 2,971,825 shows a dispenser for dissolving and dispensing solutes bypassing a variably controlled portion of the inflowing fluid into and out of a mixing chamber which contains the solute and which is partially covered by a screen. Turbulent flow in the region of the perforated end and extensive wetting and mixing of solvent and undissolved solute are encouraged by the structure of the device of this patent but avoided by the device of the present invention.

The apparatus of the present invention provides means for dissolving a solid particulate material, for example, calcium hypochlorite in granular or tabletted form at variable but accurately controllable rates for the treatment of water without preparing large quantities of stock solutions of hypochlorite. The apparatus of this invention has the important advantage of directly controlling the input of hypochlorite solution into the body of water being treated independent of metering the water introduced into the feeder to form the hypochlorite solution. Clogging of the device is avoided since the hypochlorite solution flows freely into the body of water being treated carrying with it any suspended matter from the feeder. The suspended matter dissolves completely in the large body of water being treated. In addition, the apparatus of this invention permits remarkably accurate calibration and provides constant and reproducible rates of feed.

In general, the apparatus of the present invention is a dissolving and dispensing device generally comprising a container and a supply magazine disposed in said container. An inlet passage in the container is provided for fluid flow thereinto and an outlet passage is provided for outward fluid flow. At least one orifice divides the fluid flow in the container into a first stream having a relatively large rate of flow and a second stream having a relatively small rate of flow. The supply magazine has a generally pervious end and soluble particulate material is disposed in the magazine. The magazine is adjustably positioned in the container so that the soluble particulate material disposed in the magazine is contacted by and dissolves in the second stream.

In a more particular embodiment, the device of the present invention is a dissolving and dispensing device generally comprising (1) a container, (2) an adapter in said housing and (3) a supply magazine in said adapter. A partition is disposed preferably horizontally in the container dividing the container into an upper and a lower chamber. The partition extends nearly completely across the housing. An inlet passage in the upper chamber is provided for fluid flow thereinto and an outlet passage is provided, suitably at the opposite end of the upper chamber for outward fluid flow. The outlet passage is formed between the end of the dividing partition and the wall of the housing. In the inlet passage is at least one orifice for fluid flow through the partition into the lower chamber. The outlet end of the lower chamber is formed by a weir adapted to retain in the lower chamber a portion of the fluid flowing into the lower chamber via the orifice in the dividing partition. The weir is designed to allow retention of a portion of the fluid flowing into the lower chamber as a quiescent body and to allow overflow of a portion of the flow into the outlet passage of the upper chamber where it joins the first stream of fluid. The weir advantageously carries a weep hole through which the fluid is emptied from the lower chamber when the inlet fluid flow is stopped.

An opening, preferably circular, is provided in the top of the housing and in the dividing partition. These two openings are joined by a cylinder which seals the upper chamber and prevents fluid flow from the upper chamber through the top of the container or through the partition. The sealing cylinder is suitably internally threaded, at least in part, to receive an adapter.

A cylindrical adapter is provided which is externally threaded to match the internal threads of the sealing cylinder and the adapter is adjustably inserted into the sealing cylinder. Suitably the adapter is positioned with its lower end extending into the lower chamber. The lower end terminates with internal stop means, suitably a shoulder or ring. The adapter extends upwardly above the top of the housing even when the lower end of the adapter is extended well into the lower chamber. This upward extension of the adapter serves to support a supply magazine inserted into the adapter.

The supply magazine has the form of a cylinder with one closed end and one open end. The open end is insertable into the adapter and rests by gravity on the stop means in the lower end of the adapter. The supply magazine is removable and, separate from the dispensing device, serves as a bottle suitably containing the solid in particulate form which is soluble in and is to be dispensed by the fluid supplied to the device of this invention. In this usage, the closed end of the magazine forms the bottom of the bottle. In one mode of fabrication, the bottle is filled with particulate solid and a grid of suitable mesh is applied to the open end of the cylinder and made integral therewith. A plurality of vents are spaced circumferentially in the walls of the magazine near the grid covered end. An internally threaded cap is provided for the open end of the supply magazine and the latter bears external threads cooperating therewith. The external threads on the supply magazine are located so that the cap covers the vents and seals the magazine. In use the cap is removed and the supply magazine is inverted in the adapter.

The magazine is not readily refillable and when the supply of solid in the magazine is exhausted, the magazine is discarded and replaced by a filled magazine. The manufacturer fills the magazine with solute of any suitable particle size, seals the magazine, suitably by fusion or cementing and applies a cap covering the pervious end including the vents in the walls of the magazine near the pervious end. The thus sealed magazine is adapted for shipment, storage and display. The manufacturer can guarantee the contents of the magazine since it is effectively sealed and the customer can rely on this guarantee since the magazine is effectively non-refillable.

The accompanying figures show one embodiment of the invention. FIGURE 1 is a top view of the assembled dispenser. FIGURE 2 is a sectional view of the assembled dispenser. FIGURE 3 partly in section and partly in view, shows the supply magazine with cap.

In the figures the housing generally is indicated at 1. It is divided by partition 2 into upper chamber 3 and lower chamber 4. The inlet passage for fluid is indicated at 5 and the outlet passage at 6. Orifice 7 meters the flow of fluid from inlet passage 5 into lower chamber 4. Lower chamber 4 is partially defined by weir 8 having weep hole 9 near its bottom. Cylinder 10 closes upper chamber 3 and prevents flow of fluid through the top of container 1 or through partition 2. Adapter 11 is threaded into cylinder 10 and extends into lower chamber 4 to a suitable depth. Shoulder 12 on adapter 11 forms the stop means in the adapter, holding magazine 13. The pervious end of magazine 13, inserted downwardly into adapter 11, is formed by integral grid 14. Vents 15 are provided in magazine 13. FIGURE 3 shows magazine 13 closed by cap 16 secured by threads 17 and covering vents 15 and grid 14. The magazine as shown in FIGURE 3 stands on lugs 18.

The dispensing device of this invention is suitably fabricated of metal or plastic depending on the solute and fluid with which it is to be used. Suitably the device is fabricated in two halves and the cylinder 10 is separately formed. The two halves are brought together around the cylinder 10 and the joints are welded, if metal, or fused or cemented, if plastic.

The housing and partition suitably carry reinforcing ribs at appropriate points.

The dispenser is designed to operate with fluid supplied at suitable pressure and to discharge the treated fluid at atmospheric pressure, for example, at poolside, discharging the treated fluid into the body of water to be treated.

One or more orifices are provided in the inlet passage to meter the fluid into the lower chamber. The number and size of these orifices controls the flow of the second stream of fluid which is diverted to the lower chamber for dissolution of solute from the magazine.

In contrast to devices known to the prior art, the device of the present invention provides a lower chamber to which solvent is fed through orifice means whereby the flow to the lower chamber, in which dissolution takes place, is substantially constant over a wide range of influent flow rates. This maintains a constant supply of solvent to the lower chamber, without attention or adjustment, even with wide fluctuations in solvent flow rate.

A further feature of the device of the present invention is the weir means intercepting the stream having the relatively small rate of flow to maintain a reservoir of fluid within the region of the pervious end of the magazine. The cooperation of the orifice means and the weir means provides a substantially constant level of solvent even with wide variations of influx flow rate. This, in combination with a constant submergence of the pervious end of the magazine in the solute, provides dispensation of solute at a constant rate in grams per hour, regardless of the flow rate of the solvent. This advantageous constant dispensation is provided by the device of this invention without continuous attention or adjustment. This constant dispensation rate cannot be provided by prior art devices which split the influent flow to produce a constant proportion between two streams even though that proportion is manually adjustable. In these prior art devices, fluctuations in influent flow rate are reflected in corresponding fluctuations in the flow rate of both of the two divided streams and in resulting fluctuations in the dispensation rate of solute in grams per hour.

The magazine of the device of the present invention is submerged in solvent to a small proportion compared to the total volume of the magazine, usually up to a maximum of about 10%. Submergence is constant, subject to manual adjustment for desired higher or lower dissolution rates. Magazines under line pressure as shown in the prior art are filled with solvent to varying degrees by variations in line pressure which compresses trapped air in the magazine. As line pressure rises, more of the solute is wetted. If the solute is less stable when wet, for example, as calcium hypochlorite is, the wet, undissolved solute is subjected to decomposition conditions. In the device of the present invention, the vents provided near the pervious end of the magazine allow air to enter the magazine to prevent entrance of solvent.

As solute dissolves from the pervious end of the magazine of this invention, the solute that originally was in the air space above and not wetted by solvent gradually descends to the pervious end to replace dissolved solute so that only the solute about to be dissolved is contacted by solvent flowing across the pervious end of the magazine. Air enters the vents to replace dissolved solute and prevents entrance of solvent into the magazine.

The dispensation rate in grams per hour is controlled by raising and lowering the magazine with respect to the level of solvent in the lower or dissolving chamber. Dissolving rate is independent of the rate of flow of solvent to the dispenser or through the dissolving chamber. The rate of flow of solvent suitably varies between an upper limit at which turbulence begins and a lower limit of zero flow. The dissolving rate of a solid is defined by the surface area and condition of the solid in contact with an unsaturated solution. The actual concentration of the solution varies with variations in solvent flow rate but the amount of solid dissolved per unit of time remains constant in the device of the present invention. This is a particular advantage, for example, in feeding hypochlorite to a swimming pool where the concentration of available chlorine is measured in the pool and not in the feeder effluent. If the concentration in the pool is too low, a higher dissolving rate is required and the magazine is adjusted downward to increase the volume of solute submerged.

The device of the present invention is used particularly advantageously when it is desired to dispense solutions of chemicals supplied in solid particulate form at accurately controlled rates. These rates are varied simply by controlling the depth of submergence of the magazine containing the particulate solid. The dispenser of this invention is particularly useful in the application of solid hypochlorites, for example, calcium hypochlorite, by gravity to bodies of water, for example, in treating water in swimming pools, water plants in small municipalities, bottling plants, dairies and cooling systems where the addition of a sterilizing agent is desirable. The device also can be advantageously used in the treatment of industrial wastes to destroy color, odor, and toxic constituents, and for odor and bacterial control in sewage effluents. Pressed tablets of hypochlorite are especially suitable in the present apparatus, but granular shapes and sizes of particles are also suitable. The apparatus is suitable for dissolving and feeding other chemicals, for example, sodium fluoride in minor amounts for water supplies, polyphosphates and compositions containing them for water softening, soda ash furnished as briquettes or fused soda ash for adjusting the alkalinity of aqueous bodies, sodium chloride, alum and available chlorine compounds other than hypochlorite including, for example, dichlorocyanuric acid, trichlorocyanuric acid and their salts, tetrachloroglycoluril and 1,3-dihalo-5,5-dimethylhydantoins including particularly 1,3-dichloro-5,5-dimethylhydantoin and 1-chloro-3-bromo-5,5-dimethylhydantoin.

The materials of construction in contact with the solid hypochlorites, for example, calcium hypochlorite, or solutions of hypochlorites are preferably resistant to its action. Particularly suitable for this purpose are a considerable number of plastic compositions, for example, Lucite which has the additional advantage of transparency. The apparatus may also be constructed of other resins, for example, Bakelite, nylon, polyethylene, polyvinyl chloride and polystyrene and of suitable metals including copper, brass, stainless steels and titanium.

The apparatus of the present invention is suitably connected directly to a pump or filter discharge line, eliminating control valves, check valves and line screens. It can be fabricated at low cost compared to other dispensing equipment. It is of compact construction and in operation has no moving parts. It can be quickly installed, requires a minimum of maintenance, is safe to use, simple to operate and involves no accident hazards. It requires the preparation of no stock solutions of the chemicals used. Once charged and set, it can be depended upon to operate reliably without further attention until the charge of solid chemical is spent. A simple adjustment of the depth of submergence of the magazine controls the rate of dispensation in grams per hour so that the degree of treatment can be varied over wide limits and can be changed quickly to accommodate fluctuations in demand.

Using the apparatus of this invention, a material in solid particulate form, for example, calcium hypochlorite, can be effectively and continuously dissolved at variable but accurately controllable rates. The resulting solutions are supplied without further treatment to the point of ultimate consumption suitably by introduction into a flowing liquid system or directly into the body of water to be treated.

EXAMPLE

A dispenser device of the invention, substantially as shown in the accompanying figures, was fabricated of polymethyl methacrylate. The housing was sealed around the cylinder at the top of the housing and at the partition. The opening in the top of the housing was 3.745 inches in diameter. The sealing cylinder had a diameter of 3.600 inches and a height of 1.945 inches. It had internal threads in the lower 0.750 inch matching the external threads of the adapter. The adapter had a diameter of 3.370 inches and a height of 4.060 inches. The supply magazine had a diameter of 3.180 inches and an overall length of 9.12 inches. Vent slots in the walls of the magazine near the open end had a length of 1.094 inches and a width of about 0.188 inch. Four vents were spaced circumferentially at 90° to one another. Threads to match the internal threads of a cap were provided on the cylinder beginning 1.156 inches from the open end and extending to 1.500 inches from the open end.

The supply magazine was filled with granular calcium hypochlorite and a grid was applied to the open end and fused thereto. A cap for the supply cartridge was provided having a diameter of 3.290 inches and a height of 1.549 inches. It had 0.400 inch of internal threads to match the threads on the supply magazine and it had suitable external corrugations for gripping.

The described feeder was connected to a test stand simulating a swimming pool installation to test uniformity in maintaining available chlorine levels.

The test stand consisted of a stirred tank containing 800 gallons of water at 72° F. from which 20 gallons per minute was recirculated through the feeder. A simulated load was provided by adding 5 gallons per minute of fresh water and overflowing an equivalent amount after mixing. The feeder magazine was charged with HTH tablets containing 70% of calcium hypochlorite and the test was run until the tablets were depleted. The bottom of the magazine was immersed to a depth of $5/32$ inch in the dissolving pool. Analysis of the water in the tank at ten minute intervals for 58 hours showed an acceptably uniform concentration of available chlorine of 13.37 parts per million ±30% confidence limits at 90% probability level.

What is claimed is:

1. A device for dissolving, dispersing and dispensing soluble material comprising a container having a substantially horizontal liquid inlet at one end thereof and a liquid outlet open to the atmosphere at the other end thereof, a substantially horizontal partition in said container disposed at a level below said inlet and above said outlet and dividing said container into upper and lower chambers, an opening in said partition adjacent said outlet end to provide a first stream in said upper chamber having a relatively large volume of flow, an orifice in said partition adjacent to said liquid inlet to provide a second stream having a relatively small volume of flow in said lower chamber, a circular opening in the top of said container and a cylinder passing in sealed relationship through said upper chamber and communicating with said lower chamber, a generally cylindrical magazine adapted to be inserted into said cylinder and to hold particulate solid to be dissolved in said second stream, said magazine having a closed upper end and a foraminous lower end, a plurality of vents spaced circumferentially in the walls of said magazine adjacent the foraminous end, adapter means adjustably mounted in said cylinder for holding said magazine and adjusting the position of said magazine relative to said lower chamber effective to control the rate of dissolution of said solid, and weir means in said lower chamber adjacent said outlet end effective to maintain a reservoir of liquid within the region of said foraminous end of said magazine.

2. The device as claimed in claim 1 in which said adapter includes stop means to limit insertion of said magazine into said adapter.

References Cited

UNITED STATES PATENTS

| | | | |
|---|---|---|---|
| 278,045 | 5/1883 | Reich | 23—272.7 X |
| 322,102 | 7/1885 | Hyatt | 23—272.7 |
| 1,216,051 | 2/1917 | Bayley | 23—272.7 |
| 1,757,140 | 5/1930 | Pulkinghorn | 23—272.7 X |
| 2,044,821 | 6/1936 | Urban | 23—272.7 |
| 2,971,825 | 2/1961 | Kersh | 23—272.7 |
| 3,107,156 | 10/1963 | Fredericks | 23—272.7 X |
| 3,416,897 | 12/1968 | Long | 23—272.7 X |

FOREIGN PATENTS

| | | |
|---|---|---|
| 378,501 | 7/1923 | Germany. |
| 603,664 | 10/1934 | Germany. |

NORMAN YUDKOFF, Primary Examiner

S. J. EMERY, Assistant Examiner

U.S. Cl. X.R.

239—310, 316